Sept. 10, 1957  R. W. TAYLOR  2,805,836
CUT-OFF GATE CONSTRUCTION
Filed Aug. 20, 1954  3 Sheets-Sheet 1
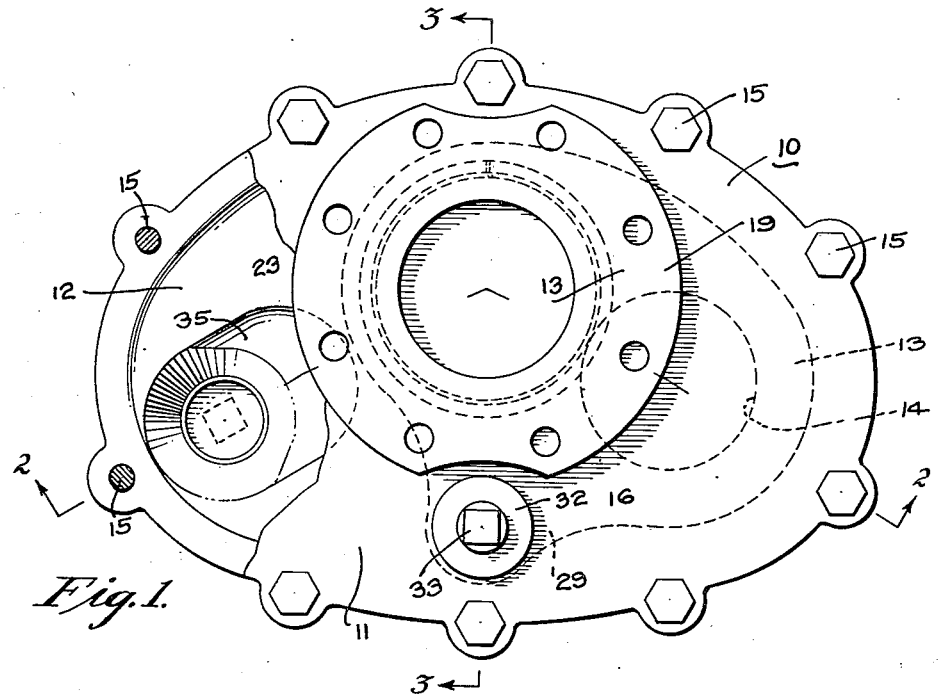
Fig. 1.
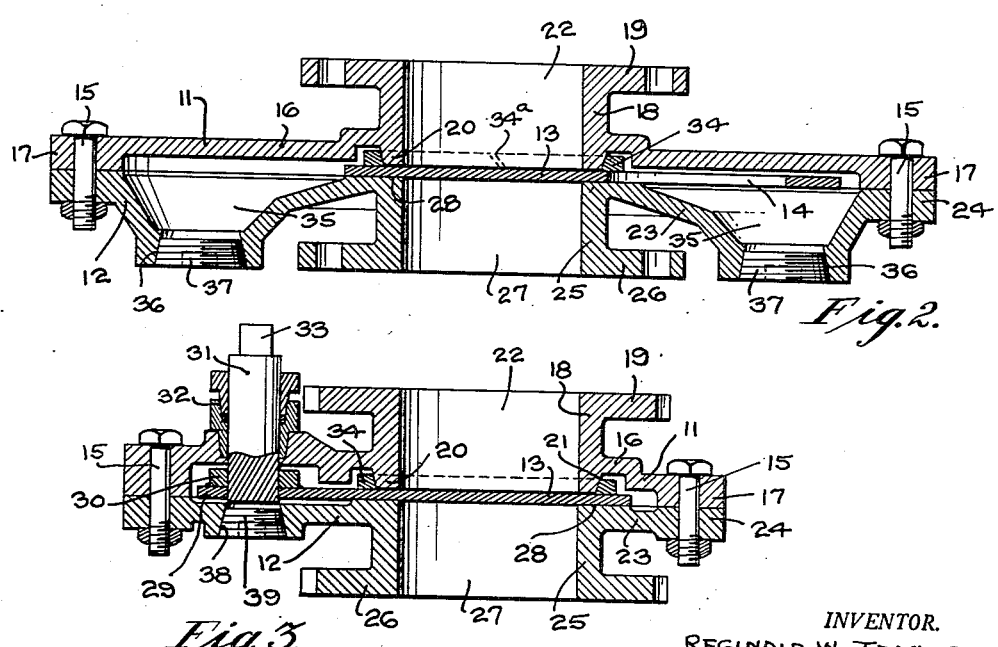
Fig. 2.
Fig. 3.
INVENTOR.
REGINALD W. TAYLOR
BY
ATTORNEY.

INVENTOR.
REGINALD W. TAYLOR
BY
ATTORNEY.

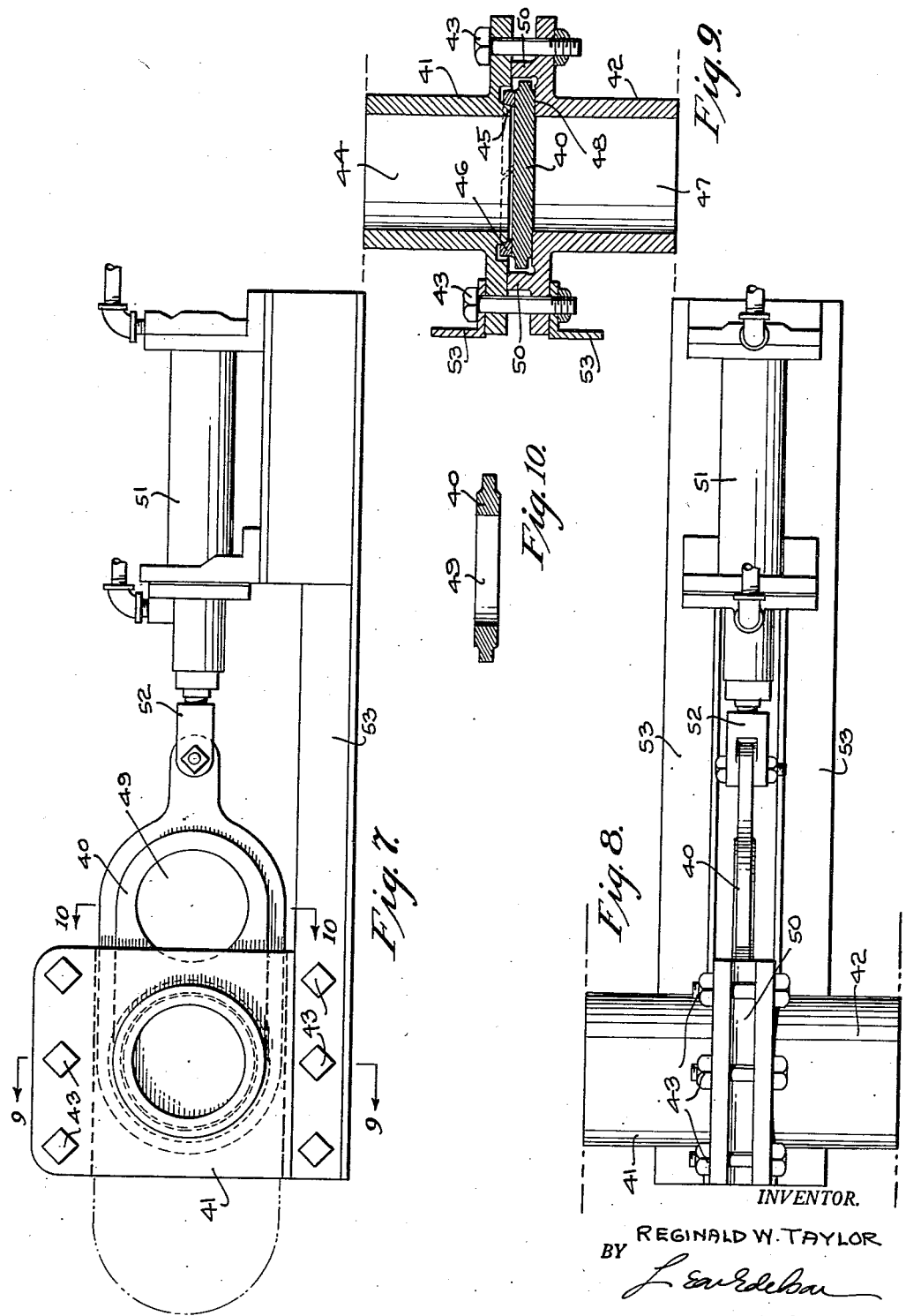

United States Patent Office 2,805,836
Patented Sept. 10, 1957

2,805,836
CUT-OFF GATE CONSTRUCTION

Reginald W. Taylor, Philadelphia, Pa., assignor to Beaumont Birch Company, Philadelphia, Pa., a corporation of Pennsylvania Application August 20, 1954, Serial No. 451,206

7 Claims. (Cl. 251—177)

The present invention relates generally to conduit systems and more particularly to improvements in valves of the gate shut-off type adapted to be used in vacuum and pressure conveying systems for the handling of various materials.

In its most general aspects, the present invention relates to a low head-room valve of the type which includes interconnected main body portions respectively provided with coaxially alined passages therethrough, these passages terminating in closely spaced peripheral edges between which is disposed a shiftable shut-off gate in the form of a flat plate one portion of which is apertured to provide a through opening which may be presented in and out of registry with the axially alined passages through the valve body.

Among the principal objects of the present invention is to provide in the valve a self-acting means operative constantly to resiliently press the shut-off gate flatwise against a flat seating surface formed at the inner edge of the passage through the valve body which is located on the downstream side of the shut-off gate, thereby effectively closing the conduit against flow of material therethrough when the shut-off gate is shifted into its valve-closing position.

More specifically, it is an object of the present invention to provide in operative association with one of the gate frames of the cut-off valve a contractile ring which is so tapered complementally to the taper of that part of the gate frame on which it is mounted that the ring exerts a constant bias against the above-mentioned gate plate to press it firmly against the opposite gate frame, to thereby effectively seal off the passage through the valve when the gate plate is shifted into its valve closing position.

Still another object of the invention is to provide an air and dust-tight valve which is internally provided with a shiftable gate plate and in which the plate is constantly under such bias in one direction that when it is disposed in valve closing position the passage through the valve is effectively sealed off regardless of whether the gate plate is mounted for operation in a vertical or a horizontal plane and regardless of whether the conduit in which the valve is incorporated is under pressure, as in the case of a pressure operated conveying system, or under vacuum, as in the case of a vacuum system.

Still another object of the invention is the provision in a material conveying conduit of a cut-off gate in the form of a flat plate which is shiftable transversely of the conduit passage into and out of passage closing position, the plate having operatively associated therewith a contractile ring which serves the dual function of constantly pressing the plate into flatwise sealing contact with a seat for the plate located on the downstream side thereof and of sealing the upstream surface of the plate to the conduit, whereby the interior of the latter is effectively sealed from the surrounding atmosphere during any and all positions assumed by the cut-off gate.

A still further object of the invention is to provide a cut-off gate valve of the character aforesaid wherein the shiftable gate-plate is entirely enclosed within an air-tight body and is provided with means operable externally of the body for shifting the gate into opened or closed position and wherein the valve body is provided with means for facilitating the removal of any material which may have accumulated therein and which may tend to adversely offset the operating efficiency of the valve.

Other objects and advantages of the invention, such as those relating to economies effected in the design and construction of the valve and through the use thereof in conduit systems for conveying various materials either under vacuum or under pressure, will be apparent more fully hereinafter, it being understood that the present invention consists substantially in the combination, construction, location and relative arrangement of parts, all as described in the detailed specification which follows, as shown in the accompanying drawings and as finally pointed out in the appended claims.

In the accompanying drawings, which are illustrative of certain preferred embodiments of the invention:

Figure 1 is a plan view of one form of valve constructed in accordance with and embodying the principles of the present invention;

Figure 2 is a vertical sectional view as taken along the line 2—2 of Figure 1;

Figure 3 is a vertical sectional view as taken along the line 3—3 of Figure 1;

Figure 7 is an elevational view of a modified construction of the valve of the present invention wherein the shut-off gate is rectilinearly shiftable into and out of its material cut-off position;

Figure 8 is a side elevational view of the assembly shown in Figure 7;

Figure 9 is a sectional view as taken along the line 9—9 of Figure 7; and

Figure 10 is a sectional view of the gate plate, per se, as taken along the line 10—10 of Figure 7.

Figure 6:
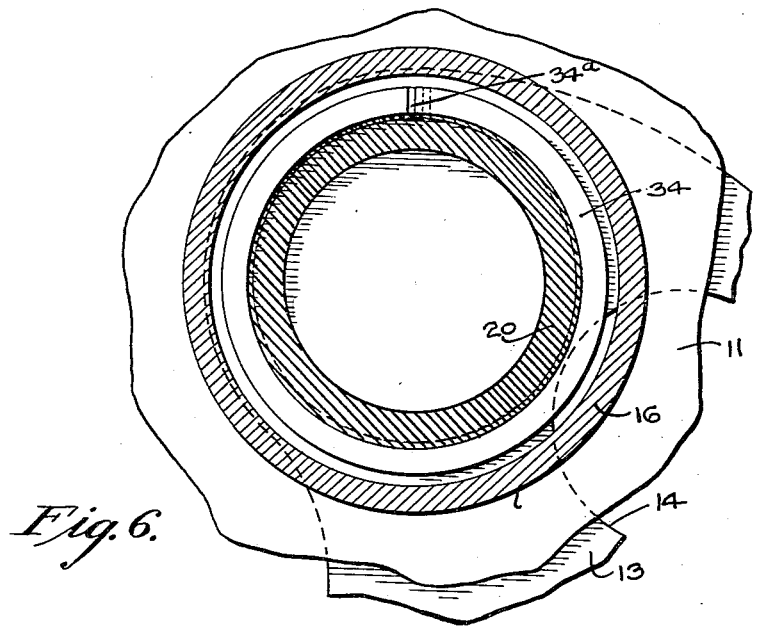
Figure 6 is a horizontal sectional view as taken along the line 6—6 of Figure 5.
Figure 4:
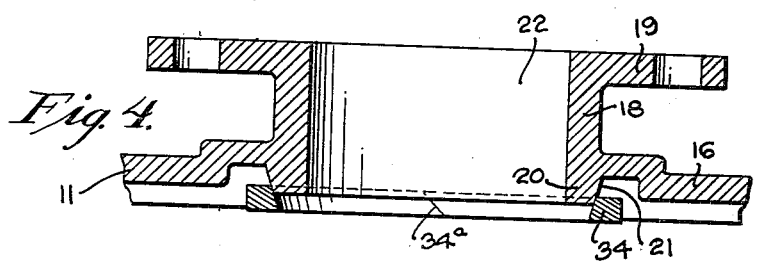
Figure 4 is a vertical sectional view of the central portion of one of the gate frames of the valve, this gate frame being that normally disposed on the upstream side of the shut-off gate.
Figure 5:
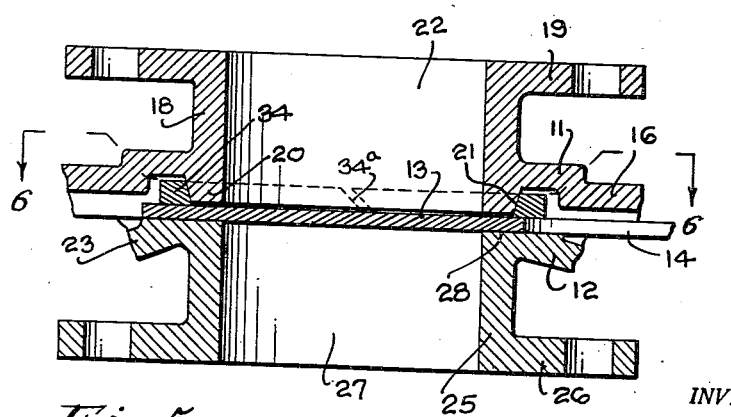
Figure 5 is a vertical sectional view showing on a somewhat enlarged scale the central portion of the valve assembly shown in Figure 3.

Referring now to the drawings, and more particularly to Figures 1 to 6 thereof, it will be observed that the valve therein illustrated, designated generally by the reference numeral 10, comprises a pair of main body parts 11 and 12, which serve as supporting frames for the intervening shut-off gate 13 in the form of a swingably mounted flat plate of ellipsoidal outline having an opening 14 in one end portion thereof.

The gate frames 11 and 12, which are also ellipsoidal in external shape, are secured together along their marginal edges by a series of bolts 15 to provide a relatively shallow, air tight casing for the shut-off gate 13, the frame being respectively provided with axially alined passages with which the opening 14 of the shut-off gate is adapted to register when the valve is operated to open the conveying line for the free passage of material therethrough.

More specifically, the gate frame 11, which for descriptive purposes may be considered the upstream frame because it is normally disposed on the upstream side of the shut-off gate, is cast or otherwise formed to provide a main body member 16, preferably of elliptical shape, having a thickened bolting edge 17 and a circular neck 18 disposed with its axis extending normal to the general plane of the body member 16 and located substantially on the minor axis of the ellipse to one side of the point of intersection of the major and minor axes of the ellipse. The neck portion 18 of the upstream gate frame 11 is flanged at its outer end, as at 19, to facilitate bolting of the frame to the correspondingly flanged part of the conduit (not shown) of which the valve forms a part, while the inner end of said neck portion 18 is in the form of an internal annular projection 20 having an externally tapered surface 21. The central passage 22 through the neck 18, of course, is in constant registry with the interior of the conduit immediately associated therewith.

The downstream gate frame 12 is generally similar in construction and is also provided with a main body part 23 having thickened bolting edge 24 and a circular neck portion 25 which is adapted for coaxial registry with the neck portion 18 of the upstream gate frame 11. As in the case of the gate frame 11, the neck portion 25 of the gate frame 12 is flanged at its outer end, as at 26, for bolting thereof to the correspondingly flanged part of the conduit on the downstream side of the valve, the downstream portion of the conduit being, of course, in registry with the passage 27 through the neck 25.

It will be noted that the inner end of the neck 25 of the gate frame 12 is machined to provide a flat-surfaced seat 28 marginally surrounding the passage 27 and that said seat is axially spaced from the externally tapered internal projection 20 in the gate frame 11 a distance just sufficient to accommodate more or less freely the shut-off gate plate 13 with the downstream face thereof overlying the seat 28.

The shut-off plate 13 is provided at the center of one side thereof with a laterally projecting portion 29, which is suitably reinforced, as at 30, to mount an operating shaft 31. This shaft 31, suitably secured in fixed relation to the shut-off gate plate 13, extends through a stuffing-box gland 32 fitted in the body 16 of the gate frame 11 to one side of the alined passages through the valve and is provided at its outer end with a squared extension 33 for reception of an operating lever (not shown) for oscillation of the gate plate into valve opening or closing position.

Figures 1, 2 and 3 shows the gate plate 13 swung into position so that the opening 14 is out of registry with the alined gate frame passages 22 and 27, it being understood, of course, that these passages are open to conveyance of material therethrough only when the plate 13 is swung to present its opening 14 into full or partial registry therewith.

In order to insure sealing engagement of the downstream face of the shut-off gate 13 with the flat-surfaced seat 28 of the gate frame 12, the annular projection 20 of the frame 11 is fitted with a contractile ring 34 which is circumferentially split, as at 34ª, and the inner face of which is tapered complementally to the external taper of the projection 20. The effective internal diameter of this ring is such that it tends constantly to contract while fitted on its supporting projection 20 as the result of which its taper, coacting with that of the projection 20, imparts to the ring a constant bias toward and against the upstream face of the shut-off gate 13, thereby pressing the latter tightly against the flat-surfaced seat 28 of the downstream gate frame 12. It will be noted that the plate-engaging face of the contractile ring 34 is flat and provides a relatively broad surface of contact against the cut-off gate plate 13, so that when the latter is pressed tight against its downstream seat 28 to seal the escape of material from the valve (and conduit) laterally thereof along the downstream face of the gate plate 13, an effective seal against the escape of material from the upstream side of the gate plate is also provided by the ring 34 by virtue of its sealing fit within the acute angle formed between the externally tapered surface of the ring mounting projection 20 and the flat upstream face of the gate plate 13.

It will be apparent that while during all positions of the swingable gate plate 13 the sealing ring 34 operates effectively to press the gate 13 against its downstream seat 28 and to seal the upstream face of the gate against lateral escape of material from the conduit, the gate 13 is nevertheless readily shiftable into any desired position within the limits of its permissible travel to fully or partially open or close the conveying conduit as may be required.

Inasmuch as a certain amount of the conveyed material may be carried by the apertured gate plate laterally of the conduit and deposited in the body portion of the valve which immediately surrounds the material conveying passage therethrough, it may be desirable to provide the valve body with a pair of spaced pockets 35—35 in which such gate transferred material may be deposited and from which it may be readily cleaned out, as by way of clean-out openings 36—36 normally closed by readily removable plugs 37—37. It will be understood, however, that such pockets 35—35 and their associated clean-out plugs are not essential in all cases and may be dispensed with, if desired.

Also, it will be noted that the downstream gate frame 12 may be provided with an opening 38 corresponding to and in axial alinement with that in the upstream gate frame in which is fitted the packing gland 32 for the operating shaft 31, so that if desired this shaft may extend through and be supported by the main body portion of the downstream gate frame, instead of extending through the upstream frame as shown. The shaft opening 38 not in use is, of course, closed by a removable plug, such as that designated 39 in Figure 3.

Figures 7 to 9, inclusive, show a somewhat modified construction wherein the shut-off gate plate, therein designated 40, is rectilinearly shiftable between a pair of gate frames 41 and 42 suitably bolted together, as by the bolts 43. As in the previously described form of the cut-off valve, the upstream gate frame 41 is provided with a conduit system 44 the inner end of which terminates in an externally tapered annular projection 45 about which is closely fitted a complementally tapered contractible sealing ring 46. The downstream gate frame 42 is similarly provided with a conduit section 47 in axial alinement with the conduit section 44, said section 47 having at its inner end a flat seat 48 for the gate plate 40. The contractile sealing ring 46 operates exactly as that of the previously described form of valve to constantly press the gate plate 40 against its downstream seat 48 and to seal the upstream face of the gate to the inner end of the upstream conduit section 47, during all shifting movement of the cut-off gate to present its opening 49 fully or partially in or out of registry with the passages through the alined conduit sections 44 and 47 of the valve. In order to enclose the opposite sides of the shiftable gate and a suitable guideway for rectilinear shifting movement thereof, one or the other of the gate frames 41—42 is provided with a pair of laterally spaced, parallel flanges 50—50, which are of a depth sufficient to maintain the bolted-together frames in proper spaced relation, as best shown in Figure 9.

Of course, any suitable means either manual or power operated, may be employed for actuating the gate plate of either form of the valve described hereinbefore. For example, the gate plate may be actuated by a fluid-pressure operated motor, such as that designated by the reference numeral 51 in Figures 7 and 8, having a piston suitably connected, as by a link 52, to the shiftable gate plate 40.

Any suitable means may be provided for mounting the valve in operative relation to its operating gear. Thus, as shown in Figures 7 to 9, the valve and the fluid pressure motor for operating the same may be commonly mounted upon supporting rails 53—53 which in turn may be secured in fixed position by any suitable supporting structure.

What is claimed as new and useful is:

1. A cut-off valve of the character described for use in a material conveying conduit system comprising, in combination, a pair of axially alined conduit sections disposed in axially separated relation to provide a space between the proximate inner ends thereof, a cut-off gate in the form of a flat plate disposed in the space aforesaid for shifting movement laterally of said axially alined conduit sections, one of said sections on the downstream side of said gate plate being provided with a flat-surfaced seat against which the downstream face of said plate is adapted to be seated and the other of said sections on the upstream side of said gate plate being provided with an annular extension which is externally tapered inwardly toward the upstream face of the gate plate, a contractile ring carried by said annular extension, said ring being internally tapered complementally to the external taper of said extension whereby said ring tends constantly to shift axially of said extension toward the gate plate to exert a constant bias on the latter to maintain its downstream face in flatwise seating engagement with the flat-surfaced seat aforesaid, said ring being operative additionally as an effective seal between the upstream face of the gate plate and the tapered extension of the conduit section on the upstream side of the gate plate.

2. In a cut-off valve as defined in claim 1 wherein the gate plate is transversely dimensionally greater than the overall diametric dimension of said axially alined conduit sections and wherein said sections are respectively provided with complementally recessed, laterally extending body members which conjointly provide a cavity extending laterally of the passage through said conduits in at least two directions to provide space for shifting movement of the gate plate into and out of passage-closing position.

3. In a cut-off valve as defined in claim 1 wherein said conduit sections are respectively provided with complementally recessed, laterally extending body members of a size and shape to conjointly provide an air-tight cavity surrounding the passage through said conduit sections and in communication with the space between the proximate inner ends thereof sufficiently large to permit shifting movement of the gate plate into and out of passage-closing position.

4. In a cut-off valve as defined in claim 1 wherein said conduit sections are respectively provided with complementally recessed, laterally extending body members of a size and shape to conjointly provide an air-tight cavity surrounding the passage through said conduit sections and in communication with the space between the proximate inner ends thereof sufficiently large to permit shifting movement of the gate plate into and out of passage-closing position, said cavity being provided in spaced regions thereof with enlarged pockets for the accumulation of material which may be drawn laterally of the passage by the shiftable gate plate.

5. In a cut-off valve as defined in claim 1 wherein said conduit sections are respectively provided with complementally recessed, laterally extending body members of a size and shape to conjointly provide an air-tight cavity surrounding the passage through said conduit sections and in communication with the space between the proximate inner ends thereof sufficiently large to permit shifting movement of the gate plate into and out of passage-closing position, said cavity being provided in spaced regions thereof with enlarged pockets for the accumulation of material which may be drawn laterally of the passage by the shiftable gate plate, said pockets being respectively provided with means for facilitating removal of any material accumulated in said pockets.

6. A valve of the character described comprising a pair of axially separated conduit sections respectively providing axially alined material intake and discharge passages, a cut-off gate in the form of a flat plate disposed in the space between said axially separated conduit sections, said gate plate being shiftable in its own plane transversely of said axially alined passages and having an opening in one portion thereof adapted to be presented in and out of registry with said passages, and a contractile sealing ring closely embracing one of said conduit sections and disposed adjacent said gate plate in contact therewith, the portion of said condut section embraced by said ring being externally axially tapered to effect resilient biasing of said ring axially toward said gate plate whereby to resiliently press the latter into sealing contact with the other of said conduit sections, irrespective of the shifted position of said gate plate.

7. A valve as defined in claim 6 wherein the contractile sealing ring is internally axially tapered and the circumferentially extending axially tapering surfaces of the conduit section and said ring are disposed in mutually overlying relation, whereby said ring serves as an annular seal between the end of the conduit section embraced thereby and the gate plate, irrespective of the shifted position of said gate plate.

References Cited in the file of this patent

UNITED STATES PATENTS

| 1,049,450 | Caskey | Jan. 7, 1913 |
| 1,404,028 | Jones | Jan. 17, 1922 |
| 1,954,018 | Miller | Apr. 10, 1934 |

FOREIGN PATENTS

| 166,516 | Great Britain | of 1921 |
| 408,444 | Italy | Dec. 29, 1944 |